United States Patent
Gunther et al.

(10) Patent No.: US 7,436,774 B2
(45) Date of Patent: Oct. 14, 2008

(54) COMMUNICATION NETWORK CONNECTION REROUTING METHODS AND SYSTEMS

(75) Inventors: Brian Wilfred Gunther, Stittsville (CA); Mohammad Farook, Ottawa (CA); Eniko Popescu, Ottawa (CA); Dan Renaud, Ottawa (CA); Michael Nicholas Tofinetti, Kanata (CA)

(73) Assignee: Alcatel Lucent, Paris (FR)

( * ) Notice: Subject to any disclaimer, the term of this patent is extended or adjusted under 35 U.S.C. 154(b) by 923 days.

(21) Appl. No.: 10/854,964

(22) Filed: May 27, 2004

(65) Prior Publication Data

US 2005/0265231 A1    Dec. 1, 2005

(51) Int. Cl.
H04L 12/56    (2006.01)
(52) U.S. Cl. .................. 370/236.2; 370/395.1
(58) Field of Classification Search .......... None
See application file for complete search history.

(56) References Cited

U.S. PATENT DOCUMENTS

| | | | |
|---|---|---|---|
| 5,864,555 A * | 1/1999 | Mathur et al. ............ | 370/236.2 |
| 6,181,680 B1 * | 1/2001 | Nagata et al. ............ | 370/248 |
| 6,538,987 B1 * | 3/2003 | Cedrone et al. .......... | 370/216 |
| 6,865,158 B2 * | 3/2005 | Iwamoto .................. | 370/248 |
| 6,865,602 B1 * | 3/2005 | Nijemcevic et al. ...... | 370/241.1 |
| 6,891,794 B1 * | 5/2005 | Hughes .................... | 370/225 |
| 7,088,674 B2 * | 8/2006 | MacKiewich et al. .... | 370/225 |
| 2004/0202113 A1 * | 10/2004 | McAllister et al. ....... | 370/252 |
| 2005/0243731 A1 * | 11/2005 | Smith et al. ............. | 370/241.1 |
| 2005/0249119 A1 * | 11/2005 | Elie-Dit-Cosaque et al. | 370/236 |

(Continued)

FOREIGN PATENT DOCUMENTS

EP    1176759 A2    1/2002

OTHER PUBLICATIONS

A. Hensen: "Asynchronous Transfer Mode (ATM); Management information model for the X-interface between Operation Systems (OSs) of a Virtual Path (VP)/Virtual Channel (VC) cross connected network; Part 1: Configuration management; EN 300 820-1" ETSI Standards, European Telecommunications Standards Institute, Sophia-Antipo, FR, Sep. 1999, pp. 1-110, XP014023069, *paragraphs '7.2.1, '7.2.5, '7.2.6, '7.3.1, '7.3.14, '000C, figure 15.

(Continued)

*Primary Examiner*—Anh-Vu H Ly

(57) ABSTRACT

Methods and systems for communication network element configuration and connection rerouting are disclosed. For a communication network connection between network elements, one of which supports a local connection rerouting function to detect a loss of continuity on the connection based on continuity check signals and to reroute the connection responsive to the detection and another of which does not support the local connection rerouting function, the non-supporting network element is configured to send continuity check signals to the supporting network element over the connection, and the local connection rerouting function is enabled at the supporting network element. The supporting network element then monitors the connection to detect loss of continuity and reroutes the connection responsive to the detection. A non-supporting network element may also monitor a connection for continuity check signals sent from a supporting network element to detect a loss of continuity on the connection, send a loss of continuity alarm to a remote system responsive to detecting a loss of continuity, and reroute the connection at the first network element responsive to a connection rerouting command from the remote system.

43 Claims, 3 Drawing Sheets

U.S. PATENT DOCUMENTS

2005/0276227 A1* 12/2005 Gunther et al. .......... 370/241.1

OTHER PUBLICATIONS

Sanghwan Lee et al: "Proactive vs reactive approaches to failure resilient routing", INFOCOM 2004. Twenty-Third Annual Joint Conference of the IEEE Computer and Communications Societies Hong Kong, PR China Mar. 7-11, 2004, Piscataway, NJ, USA, IEEE, vol. 1, Mar. 7, 2004, pp. 176-186, XP010740801 ISBN: 0-7803-8355-9 *abstract * * p. 176, left-hand col., line 1—p. 177, left-hand col., line 7*.

European Search Report.

* cited by examiner

US 7,436,774 B2

COMMUNICATION NETWORK CONNECTION REROUTING METHODS AND SYSTEMS

FIELD OF THE INVENTION

This invention relates generally to communication networks and, in particular, to rerouting of communication network connections upon loss of continuity (LOC).

BACKGROUND

Many communication networks support some sort of connection continuity monitoring function. Operations Administration and Maintenance continuity checking (OAM CC) is an example of one such function for Asynchronous Transfer Mode (ATM) networks. According to OAM CC, cells are sent from a network element at one or both ends of a communication network connection, and a connection failure or fault, generally referred to as loss of continuity or LOC, is detected when the cells are not received when expected at the other end of the connection. Cell transmission and reception are typically accomplished by configuring an OAM CC source at a network element at one end of a connection and an OAM CC sink at a network element at the other end of the connection, as described, for example, in U.S. patent application Ser. No. 09/624,756, entitled "Network Management Support For OAM Functionality And Method Therefore", filed Jul. 24, 2000, and incorporated in its entirety herein by reference. OAM sources inject OAM cells into a dataflow on a connection, and OAM sinks extract these cells from the dataflow for analysis. Bidirectional continuity checking is provided by configuring an OAM CC source and sink at each end of a connection.

In response to detecting LOC, a connection may be rerouted through an alternate communication path in the network. In one conventional rerouting technique, an LOC alarm is sent from a network element to a network management system, and the network management system controls rerouting of the connection. This technique, however, consumes communication network resources for transmitting alarms from network elements to the network management system and connection control signals from the network management system to network elements to reroute the connection. Network management system-based rerouting also consumes time and processing resources at the network management system.

Another connection rerouting technique provides for local connection rerouting by network elements without involvement of a network management system after a connection has been established. Where both network elements between which a connection is to be established support a local connection rerouting function, the local connection rerouting function is enabled at the network elements in response to configuration commands from the network management system when the connection is being established. The network elements then reroute the connection upon detecting LOC. In this case, an alarm may be generated at a network element, but is processed locally. Alarm transmissions to and processing by the network management system are thereby avoided. However, there are currently no mechanisms for configuring this type of reroute on LOC for a connection where a network element on either end of the connection does not detect LOC.

SUMMARY OF THE INVENTION

Embodiments of the present invention provide local connection rerouting functionality to reroute communication network connections even where a network element at one end of the connection does not support a local connection rerouting function.

According to one aspect of the invention, there is provided a method of configuring network elements between which a communication network connection may be established, one of the network elements not supporting a local connection rerouting function and another of the network elements supporting the local connection rerouting function. The method includes configuring the one of the network elements to send continuity check signals over the communication network connection, and enabling the local connection rerouting function at the other of the network elements. The local connection rerouting function is adapted to detect a loss of continuity on the communication network connection based on the continuity check signals and to reroute the communication network connection responsive to the detection.

The method may also involve determining whether the network elements support a local connection rerouting function, for example by determining a type of equipment implemented at each of the network elements from records in a database at a network management system of the communication network.

Configuration of the one network element may involve configuring a persistent endpoint, which supports at least continuity signal transmission and possibly also reception, at a remote system, illustratively a network management system, and downloading the persistent endpoint to the network element. The other network element may configure its own persistent endpoint, in response to a configuration command from the remote system for instance, to thereby enable the local connection rerouting function.

A network element which does not support the local connection rerouting function may also be configured to receive continuity check signals from another network element which supports the local connection rerouting function, to detect a loss of continuity based on the continuity check signals from the other network element, and to generate an alarm responsive to the detection. The alarm may then be sent to a remote system, which generates a connection rerouting command responsive to the alarm and sends the connection rerouting command to the network element to reroute the connection.

In a preferred embodiment, the communication network comprises an ATM network, and the continuity check signals comprise Operations Administration and Maintenance Continuity Check (OAM CC) cells.

Embodiments of the invention may be implemented for point-to-point or point-to-multipoint connections.

A system for configuring network elements between which a communication network connection may be established, one of the network elements not supporting a local connection rerouting function and another of the network elements supporting the local connection rerouting function, is also provided, and includes a transmitter and a processor. The processor is configured to configure through the transmitter the one of the network elements to send continuity check signals over the communication network connection and to enable through the transmitter the local connection rerouting function at the other of the network elements. As above, the local connection rerouting function is adapted to detect a loss of continuity on the communication network connection based on the continuity check signals and to reroute the communication network connection responsive to the detection.

According to another aspect of the invention, a method of rerouting a communication network connection between a first network element which does not support the local connection rerouting function and a second network element which supports the local connection rerouting function is provided. The method includes monitoring the connection at the first network element for continuity check signals sent from the second network element to detect a loss of continuity on the connection based on the continuity check signals, sending a loss of continuity alarm from the first network element to a remote system responsive to detecting a loss of continuity on the connection at the first network element, and rerouting the connection at the first network element responsive to a connection rerouting command from the remote system.

In a related aspect of the invention, a network element for a communication network is provided, and includes a transceiver and a processor. The processor is configured to monitor through the transceiver a communication network connection to another network element for continuity check signals sent from the other network element to thereby detect a loss of continuity on the connection, the network element not supporting the local connection rerouting function and the other network element supporting the local connection rerouting function. The processor is further configured to send a loss of continuity alarm through the transceiver to a remote system responsive to detecting a loss of continuity on the connection, and to reroute the connection responsive to a connection rerouting command received through the transceiver from the remote system.

A method of rerouting a communication network connection between a first network element which does not support the local connection rerouting function and a second network element which supports the local connection rerouting function is provided in another aspect of the invention. The method includes monitoring the connection at the second network element for continuity check signals sent from the first network element to detect a loss of continuity on the connection based on the continuity check signals, and rerouting the connection at the second network element responsive to detection of the loss of continuity.

There is also provided a network element for a communication network, the network element including a transceiver and a processor configured to monitor through the transceiver a communication network connection to another network element, the network element supporting the local connection rerouting function and the other network element not supporting the local connection rerouting function, for continuity check signals sent from the other network element to thereby detect a loss of continuity on the connection, and to reroute the connection responsive to detection of the loss of continuity.

Other aspects and features of embodiments of the present invention will become apparent to those ordinarily skilled in the art upon review of the following description of specific illustrative embodiments of the invention.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
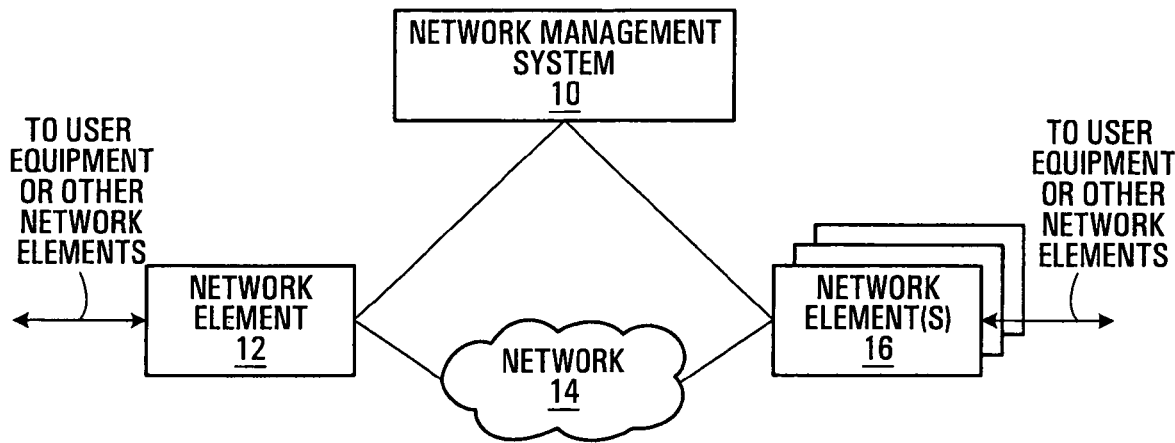
FIG. 1 is a block diagram of an example communication network in which embodiments of the invention may be implemented.

FIG. 1 is a block diagram of an example communication network in which embodiments of the invention may be implemented. The communication network in FIG. 1 includes a network management system (NMS) 10, and network elements 12, 16 between which communication network connections through the network 14 may be established. The network elements 12, 16 may also be connected to end user equipment or other network elements. As indicated by the multiple instances of the network element 16, embodiments of the invention may be applied to point-to-point connections or point-to-multipoint connections, including multicast and broadcast connections, for example.

Embodiments of the present invention are preferably implemented at the NMS 10 and network elements 12, 16. Other equipment which may be provided within a communication network or operate in conjunction with a communication network, such as end user equipment and other user, management, or control equipment, has not been explicitly shown in FIG. 1 to avoid congestion. It should therefore be appreciated that the system of FIG. 1, as well as the contents of the other drawings, are intended solely for illustrative purposes. Embodiments of the present invention are in no way limited to any particular type of network, equipment, or communications.

The network elements 12, 16 may be switches, routers, or analogous elements through which communication network connections may be established. A communication network connection may be virtually any type of connection over which communication signals are exchanged. As those skilled in the art will appreciate, connections may include wired connections, wireless connections, or some combination thereof. Connections may be established, for example, for telephone calls and data communication sessions. The particular types of communication connections available in a communication network may be dependent upon the type of the network elements 12, 16 and the protocols used therein, the services offered by service providers using the network, the type of end user equipment for which the connections are established, for instance, and possibly other factors.

In operation, the network elements 12, 16 may receive and process configuration control messages or commands to establish or set up, possibly to maintain, and to release or tear down communication network connections. Several different mechanisms may be used for communication network connection management. Some communication networks support so-called Switched Permanent Virtual Connections (SPVCs), which are NMS-controlled connections. SPVCs are established under the control of the NMS 10. The NMS 10 sends configuration commands to the network elements 12, 16 to establish a connection between the network elements 12, 16.

This type of connection, with which those skilled in the art will be familiar, represents an illustrative example of a type of connection in conjunction with which embodiments of the invention may be implemented. However, the invention is in no way limited to this particular type of connection, and may be applied to other types of connection. In other embodiments, a connection between the network elements 12, 16 may be a direct connection or an indirect connection involving other communication network equipment and connection segments therebetween.

Thus, in one embodiment, the network elements 12, 16 may be the endpoints of an SPVC through the network 14. According to another embodiment, a direct or indirect connection between the network elements 12, 16 is a segment of a connection between other network elements or end user equipment. References to connections herein should therefore be interpreted accordingly.

As described above, it may be desirable to offload the function of connection rerouting on LOC or other connection failure conditions from the NMS 10. Although connections may be established under control of the NMS 10, connection rerouting after the connection has been established may be supported locally at the network elements 12, 16. In conventional communication networks, however, local connection rerouting is only possible where both network elements at respective ends of a connection support a local connection rerouting function. In FIG. 1, if either of the network elements 12, 16 does not support the local connection rerouting function, then the NMS 10 must handle any rerouting of the connection.

Embodiments of the present invention provide the ability to locally reroute communication network connections, illustratively SPVC paths, even if one of the network elements between which the connection has been established does not support a local connection rerouting function. This allows the network to automatically recover from dataflow interruptions on connections through rerouting the connections without involving an NMS, which may increase availability of the network.

Figure 2:
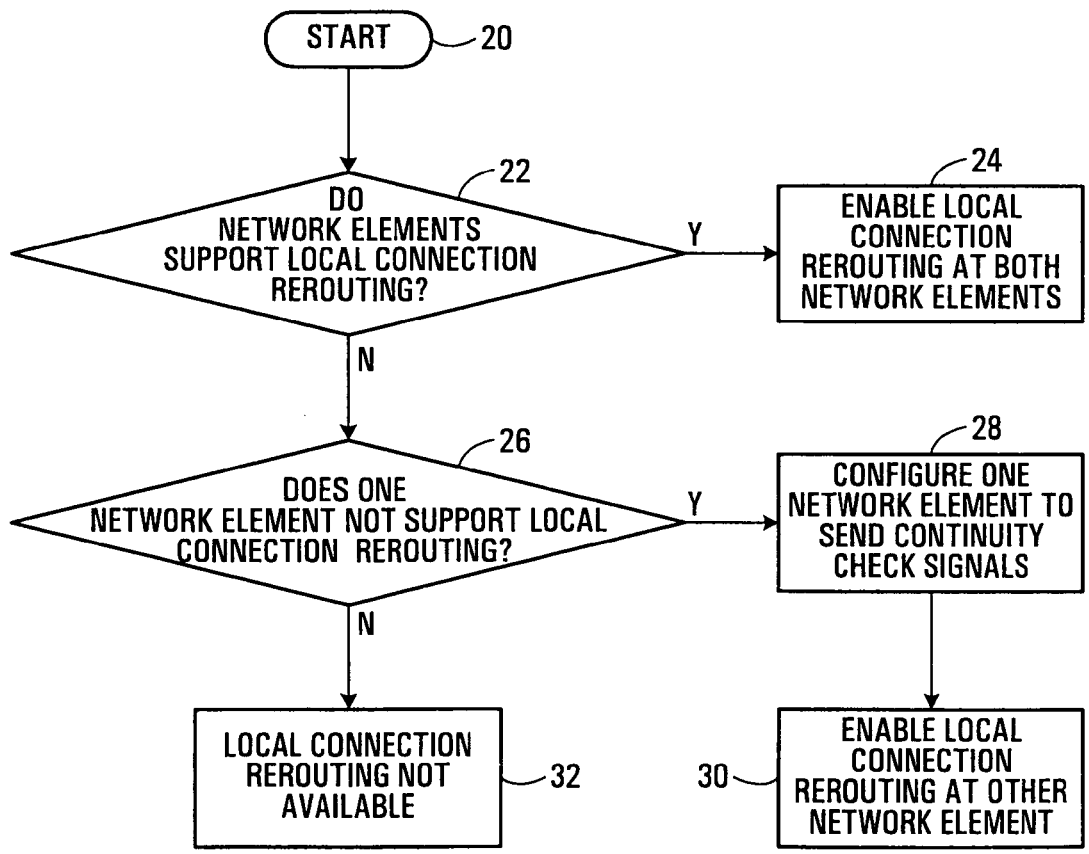
FIG. 2 is a flow diagram of a method according to an embodiment of the invention.

FIG. 2 is a flow diagram of a method according to an embodiment of the invention. The method of configuring network elements between which a communication network connection may be established, as shown in FIG. 2, starts at 20. It should be noted that the connection between the network elements may or may not have already been established. In one embodiment, the operations in FIG. 2 are performed during connection setup.

At 22, a determination is made as to whether the network elements support a local connection rerouting function, and if so, then the local connection rerouting function is enabled at both network elements at 24. This is substantially similar to a conventional technique, in which local connection rerouting is possible where both endpoints of a connection support local connection rerouting. It will thus be apparent that embodiments of the invention do not necessarily preclude communication connection rerouting according to conventional techniques if both network elements support the local connection rerouting function.

Where both network elements do not support the local connection rerouting function, as determined at 22, known communication networks cannot provide for local connection rerouting. According to an aspect of the invention, however, a further determination is made at 26 as to whether only one of the network elements does not support the local connection rerouting function while the other network element supports the local connection rerouting function. In this case, the network element which does not support the local connection rerouting function is configured at 28 to send continuity check signals over the connection. At 30, the local connection rerouting function is enabled at the other of the network elements. The local connection rerouting function is preferably adapted to detect LOC on the based on the continuity check signals and to reroute the communication network connection responsive to the detection.

Thus, according to an embodiment of the invention, local connection rerouting may be provided with only one network element which supports local connection rerouting. Local connection rerouting becomes unavailable only if neither of the network elements supports the local connection rerouting function, as indicated at 32.

The determinations at 22 and 26 may involve determining a type of equipment implemented at each of the network elements, by accessing records in a database at an NMS of the communication network, for example. These determinations may be made before the connection is established, in which case the network elements are configured according to a previous determination of local rerouting function support at each network element.

According to a preferred embodiment, the operation at 28 is performed by configuring at a remote system, illustratively at an NMS, a persistent endpoint which provides continuity signal transmission and reception at respective ends or possibly at both ends of a connection, and downloading the persistent endpoint from the remote system to the one of the network elements. Although the operation at 30 may also involve sending a configuration command or other instruction from the NMS to the other network element, a network element which supports the local rerouting function is also capable of configuring its own persistent endpoint. In another embodiment, a persistent endpoint may be configured by one network element and downloaded to another network element.

In an ATM network, the continuity check signals sent by the network element which does not support the local connection rerouting function may be OAM CC cells. The downloading of a remotely configured OAM CC persistent endpoint to the network element and enabling of the local connection rerouting function at the other network element effectively establish an OAM CC segment between the network elements, and LOC may then be detected using OAM CC techniques.

For point-to-multipoint connections, the method of FIG. 2, or at least portions thereof, may be performed or repeated for each of multiple connections between a source network element and multiple receiver network elements. In multiple-connection embodiments, the determinations at 22 and 26 may be made for the source network element and each of the receiver network elements. If both the source network element and any of the receiver network elements support the local connection rerouting function, then local connection rerouting may be enabled at 24 for connections therebetween.

Where the source network element does not support the local connection rerouting function and at least one of the receiver network elements supports the local connection rerouting function, the operations at 28 and 30 may include configuring the source network element to send continuity check signals to the receiver network elements and enabling the local connection rerouting function at the at least one of the receiver network elements.

If the source network element supports the local connection rerouting function and at least one of the receiver network elements does not support the local connection rerouting function, then the operations at 28 and 30 may be accomplished by configuring the at least one of the receiver network elements to send continuity check signals to the source network element and enabling the local connection rerouting function at the source network element.

Thus, it will be apparent that connections between a source network element and different receiver network elements for a point-to-multipoint connection may be configured differently. Some connections may have local connection rerouting enabled at both source and receiver network elements or at one of the source and receiver network element, whereas other connections might not support local connection rerouting at all, where neither the source network element nor the receiver network element supports local connection rerouting.

In one embodiment of the invention, a network element which does not support the local connection rerouting function is further configured at 28 to receive continuity check signals from the other network element, to detect LOC based on the continuity check signals from the other network element, and to generate an alarm responsive to the detection. Although the network element itself does not support the local connection rerouting function, connection rerouting may be accomplished upon detection of LOC by sending the alarm to a remote system, illustratively an NMS. At the NMS, a connection rerouting command may then be generated responsive to the alarm and sent to the network element to reroute the connection.

Figure 3:
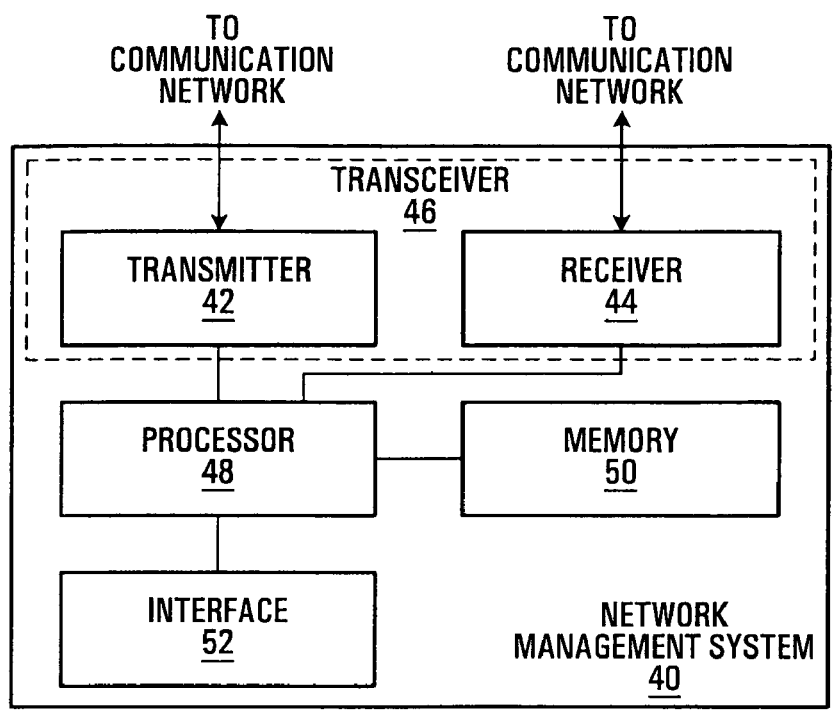
FIG. 3 is a block diagram of a network management system according to an embodiment of the invention.

FIG. 3 is a block diagram of an NMS according to an embodiment of the invention. The NMS 40 includes a processor 48 connected to an interface 52, a memory 50, a transmitter 42, and a receiver 44 in a transceiver 46, and is an illustrative example of the NMS 10 of FIG. 1. The transmitter 42 and the receiver 44 in the transceiver 46 enable communications with network elements in a communication network, through communication network control channels, for example.

The processor 48 may include one or more processing devices such as a microprocessor, a digital signal processor, an application specific integrated circuit (ASIC), a microcontroller, electronic circuitry, or other components configured to perform various functions. In one embodiment, the processor 48 includes a microprocessor which executes instructions stored in the memory 50. Although the processor 48 is configured to perform operations associated with network element configuration and possibly rerouting in accordance with embodiments of the invention, other additional features and functions may also be provided by the processor 48. Thus, the processor 48 need not necessarily be a dedicated processor.

The interface 52 may include a display, a keyboard, a mouse, and other input/output devices for receiving inputs from or providing outputs to a user.

The memory 50 may similarly include multiple memory devices. For example, processors may interact with solid state memory devices, including both volatile and non-volatile memory devices, and other types of memory device, such as hard disk drives and memory devices with removable storage media.

Many different types of transceiver may be suitable for use as the transceiver 46. The particular type and structure of the transceiver 46 is dependent upon the communication network in which the NMS 40 is implemented. It should also be appreciated that an NMS need not necessarily include both a transmitter 42 and a receiver 44. Configuration of a network element may be accomplished using only the transmitter 42.

The processor 48 is configured to determine whether network elements between which a communication network connection may be established support a local connection rerouting function. If one of the network elements does not support the local connection rerouting function and the other of the network elements supports the local connection rerouting function, then the processor 48 configures, through the transmitter 42, the one of the network elements to send continuity check signals to the other network element over the communication network connection. In this case, the processor 48 also enables the local connection rerouting function at the other of the network elements. The processor 48 may also establish conventional reroute on LOC if both of the network elements support this function, as described above with reference to FIG. 2. These functions of the processor 48 may be performed automatically when a connection is being established, or responsive to user inputs received through the interface 52, for example.

The processor 48 may also or instead configure the network elements on the basis of a previous determination of support for the local rerouting function at the network elements. The previous determination may have been made by the processor 48 or another component of the NMS 40. It is also contemplated that the determination and configuration operations performed by the NMS 40 may involve different processing devices.

In one embodiment, the memory 50 stores records of equipment implemented at each of the network elements, and the determination is made by accessing the records to determine a type of equipment implemented at each of the network elements.

As described above, configuration of a network element may involve configuring a persistent endpoint at an NMS. In the NMS 40, the processor 48 may configure a persistent endpoint and transmit the persistent endpoint through the transmitter 42 to a network element. The processor 48 may also transmit a configuration command through the transmitter 42 to the network element which supports the local rerouting function. That network element preferably configures a persistent endpoint in response to the configuration command.

The network element which does not support the local connection rerouting function may also be configured by the processor 48 to receive continuity check signals from the other network element, to detect a loss of continuity based on the continuity check signals from the other network element, to generate an alarm responsive to the detection, and to send the alarm to the system. The processor 48 may then receive the alarm through the receiver 44 and to transmit a connection rerouting command to the non-supporting network element through the transmitter 42 to reroute the connection at the non-supporting network element.

In one embodiment, the communication network connection is a point-to-multipoint connection, including a plurality of connections between a source network element and multiple receiver network elements. The processor 48 preferably configures the source network element to send continuity check signals to the receiver network elements over the plurality of connections and enables the local connection rerouting function at any of the receiver network elements which support the local connection rerouting function where the source network element does not support the local connection rerouting function. Where the source network element supports the local connection rerouting function, the processor 48 preferably configures at least one of the receiver network elements to send continuity check signals to the source network element and enables the local connection rerouting function at the source network element.

Figure 4:
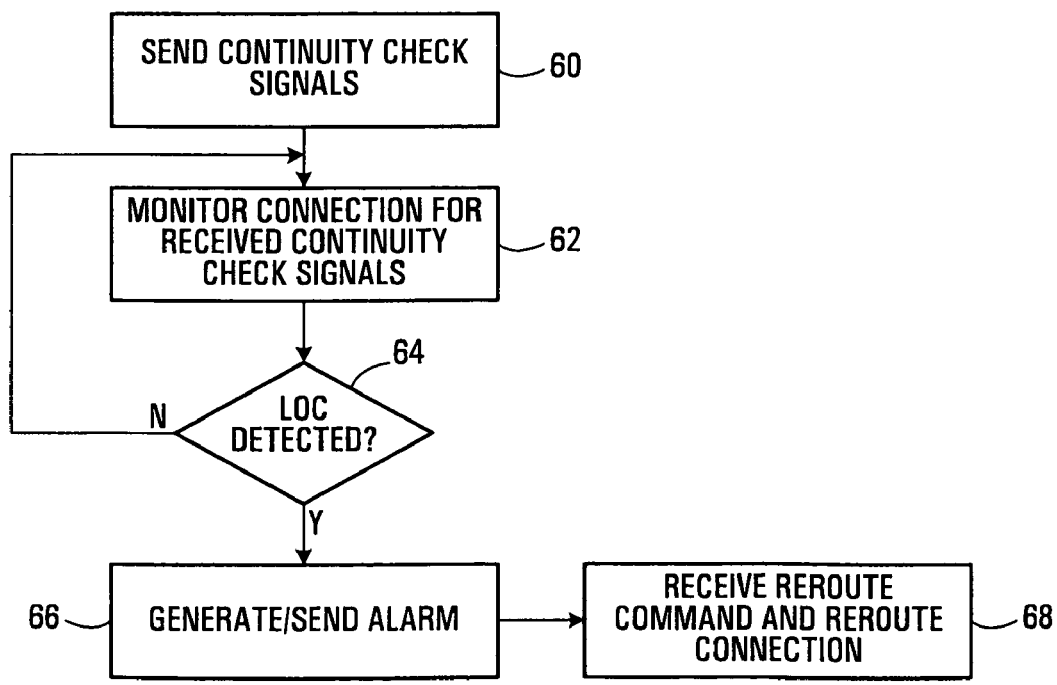
FIG. 4 is a flow diagram of a method in accordance with another embodiment of the invention.

FIG. 4 is a flow diagram of a method in accordance with another embodiment of the invention. The method of FIG. 4 relates to rerouting a communication network connection between a first network element which does not support a local connection rerouting function and a second network element which supports the local connection rerouting function. As above, the local connection rerouting function is adapted to detect a loss of continuity on the connection and to reroute the connection responsive to a loss of continuity on the connection.

Continuity check signals are sent from the second network element to the first network element at 60. The first network element monitors the connection at the first network element for the continuity check signals sent from the second network element, at 62, to detect a loss of continuity on the connection based on the continuity check signals, at 64. A loss of continuity alarm is generated and sent from the first network element to a remote system responsive to detecting a loss of continuity on the connection at the first network element, as shown at 66. The first network element then receives a connection rerouting command from the remote system and reroutes the connection at 68.

In a preferred embodiment, the remote system comprises a network management system of the communication network.

The first network element may also receive a persistent endpoint from the network management system. The network management endpoint performs the operations of monitoring the connection for continuity check signals sent from the second network element, sending the loss of continuity alarm, and rerouting the connection responsive to a connection rerouting command from the network management system.

Other operations and features described herein may also be provided in combination with the method of FIG. 4.

Figure 5:
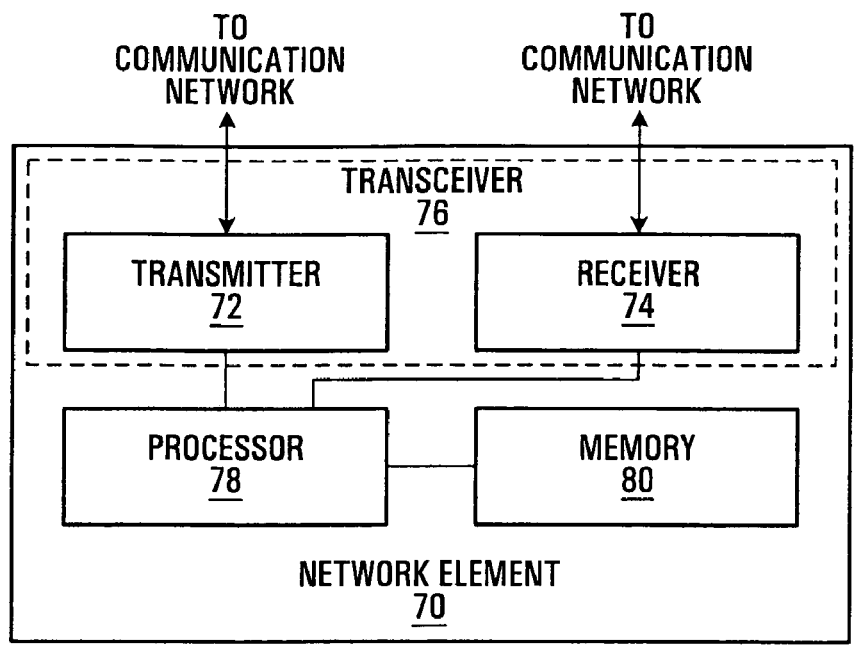
FIG. 5 is a block diagram of a network element according to a further embodiment of the invention.

FIG. 5 is a block diagram of a network element according to a further embodiment of the invention. The network element 70 includes a processor 78 connected to a memory 80, a transmitter 72, and a receiver 74.

The components of FIG. 5 may be substantially similar to similarly labelled components in FIG. 3. Thus, the processor 78 may include one or more of different types of processing device, the memory 80 may include one or more of different types of memory device, and the type of the transmitter 72 and the receiver 74 in the transceiver 76 will be dependent upon the communication network in which the network element 70 is implemented. It should be appreciated, however, that the transceiver 76, or a separate component of the network element 70, may be configured to communicate with end user equipment. A network element may include both network to network and network to user interfaces for communicating with other network elements and user equipment, respectively.

In operation, the processor 78 monitors, through the transceiver 76, a communication network connection to another network element for continuity check signals sent from the other network element. For the purposes of illustration, it is assumed that the network element 70 does not support the local connection rerouting function and the other network element supports the local connection rerouting function. In this case, the processor 78 detects a loss of continuity on the connection based on the continuity check signals, and a loss of continuity alarm is sent through the transceiver 76 to a remote system, illustratively an NMS, responsive to detecting loss of continuity on the connection. When a connection rerouting command is received through the transceiver 76 from the remote system, the processor reroutes the connection. The network element 70 is thereby provided with two mechanisms to reroute the connection, in particular the local connection rerouting function at the other network element and alarm-based rerouting responsive to a command from a remote system.

The operation of the processor 78 may be embodied in a persistent endpoint configured at the remote system and received by the network element 70 through the receiver 74 of the transceiver 76. As above, the connection may include a single connection or a point-to-multipoint connection.

The above description of FIGS. 4 and 5 relate to a network element which does not support the local connection rerouting function. However, embodiments of the present invention also provide for local rerouting of a connection at a network element even when a network element at the far end of the connection does not support the local connection rerouting function. Conventional connection rerouting techniques do not provide for local connection routing when one of the network elements does not support local connection rerouting.

According to an embodiment of the invention, a network element which supports the local connection rerouting monitors a connection for continuity check signals sent from a network element which does not support the local connection rerouting function. This interaction may be provided by adapting a continuity check signal source and/or a continuity check signal sink at either or both of the supporting and non-supporting network elements.

A method of rerouting a connection at a supporting network element proceeds substantially as shown at 60, 62, and 64 of FIG. 4. Continuity check signals are sent from a first network element which does not support the local connection rerouting function to a second network element which supports the local connection rerouting function. The second network element monitors the connection at 62 to detect a loss of continuity on the connection based on the continuity check signals. When an LOC is detected at 64, however, an alarm, if generated at all, is an internal alarm which is processed by the second network element. The connection is rerouted at the second network element responsive to detection of the loss of continuity. Thus, a network element which supports the local connection rerouting function need not send an alarm to a remote system, and reroutes the connection without intervention by a remote system.

A network element which supports the local connection rerouting function may also be substantially similar in structure to a non-supporting network element, with a structure as shown in FIG. 5, for example. In the case of a supporting network element, however, the processor 78 would be configured to reroute a connection responsive to detection of loss of continuity. In some embodiments, a supporting network element may also include different types of LOC detectors, including one detector for detecting LOC based on continuity check signals from a non-supporting network element and another detector for detecting LOC based on continuity check signals or another LOC detection scheme which may be implemented between supporting network elements.

Figure 6:
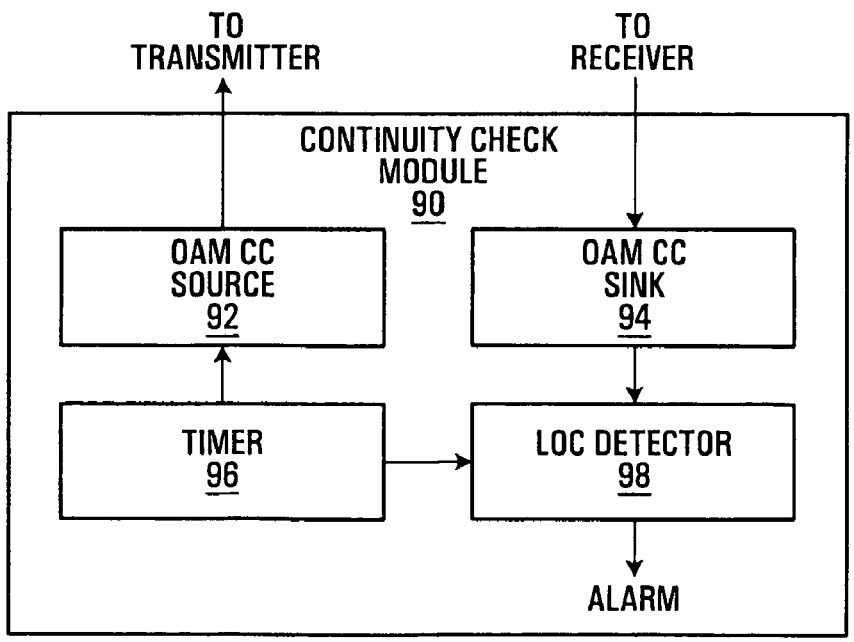
FIG. 6 is a block diagram of an illustrative example continuity check module.

In a preferred embodiment, loss of continuity is detected using OAM CC. FIG. 6 is a block diagram of an illustrative example continuity check module which may be implemented by a network element processor. In one embodiment, the continuity check module 90 is implemented in a persistent endpoint.

The continuity check module 90 includes an OAM CC source 92 and an OAM CC sink 94, which transmit and receive, cells through a network element transmitter and receiver, respectively. The timer 96 coordinates timing of CC cell transmission by the OAM CC source 92 and also provides a timing source for the LOC detector 98, which detects LOC if a CC cell is not received within a predetermined time interval. Although shown as part of the continuity check module 90, the timer 96 may be an external timing source, such as a clock source in a network element. An LOC alarm generated by the LOC detector 98 may be processed locally or sent to a remote system, depending upon whether the network element in which the continuity check module 90 is implemented supports local connection rerouting.

What has been described is merely illustrative of the application of principles of the invention. Other arrangements and methods can be implemented by those skilled in the art without departing from the scope of the present invention.

For example, embodiments of the invention may be implemented with further, fewer, or different components and operations, interconnected in a different manner than explicitly shown in the drawings and disclosed herein. In FIG. 2, for instance, the determinations may be implemented as a single determination, and the configuring and enabling operations need not be performed in the order shown and may be performed substantially simultaneously. Other variations of the embodiments shown in the drawings will be apparent to those skilled in the art.

In addition, although described primarily in the context of methods and systems, other implementations of the invention are also contemplated, as instructions stored on a computer-readable medium for example.

We claim:

1. A method of configuring network elements between which a communication network connection in a communication network may be established, one of the network elements not supporting a local connection rerouting function and an other of the network elements supporting the local connection rerouting function, the method comprising:
configuring the one of the network elements to send continuity check signals over the communication network connection; and
enabling the local connection rerouting function at the other of the network elements, the local connection rerouting function being adapted to detect a loss of continuity on the communication network connection based on the continuity check signals and to reroute the communication network connection responsive to the detection,
wherein the method further comprises determining whether the network elements support the local connection rerouting function,
wherein determining comprises determining a type of equipment implemented at each of the network elements by accessing records in a database at a network management system of the communication network.

2. The method of claim 1, wherein configuring the one of the network elements comprises configuring a persistent endpoint at a remote system and downloading the persistent endpoint from the remote system to the one of the network elements.

3. The method of claim 2, wherein the remote system comprises a network management system of the communication network.

4. The method of claim 1, wherein enabling the local connection rerouting function at the other of the network elements comprises sending a configuration command from a remote system to the other of the network elements.

5. The method of claim 4, wherein the other of the network elements configures a persistent endpoint in response to the configuration command.

6. The method of claim 4, wherein the remote system is a network management system of the communication network.

7. The method of claim 1, wherein the communication network comprises an Asynchronous Transfer Mode (ATM) network.

8. The method of claim 1, wherein the continuity check signals comprise Operations Administration and Maintenance Continuity Check (OAM CC) cells.

9. The method of claim 1, wherein the communication network connection comprises a plurality of connections between a source network element and multiple receiver network elements.

10. The method of claim 9, wherein, where the source network element does not support the local connection rerouting function and at least one of the receiver network elements supports the local connection rerouting function, the configuring step further comprises configuring the source network element to send continuity check signals to the receiver network elements over the plurality of connections and the enabling step further comprises enabling the local connection rerouting function at the at least one of the receiver network elements.

11. The method of claim 1, wherein configuring further comprises configuring the one of the network elements to receive continuity check signals from the other of the network elements, to detect a loss of continuity based on the continuity check signals from the other of the network elements, and to generate an alarm responsive to the detection.

12. The method of claim 11, wherein configuring further comprises configuring the one of the network elements to send the alarm to a remote system.

13. The method of claim 12, further comprising:
generating a connection rerouting command at the remote system responsive to the alarm; and
sending the connection rerouting command to the one of the network elements to reroute the connection.

14. A method of configuring network elements between which a communication network connection in a communication network may be established, one of the network elements not supporting a local connection rerouting function and an other of the network elements supporting the local connection rerouting function, the method comprising:
configuring the one of the network elements to send continuity check signals over the communication network connection; and
enabling the local connection rerouting function at the other of the network elements, the local connection rerouting function being adapted to detect a loss of continuity on the communication network connection based on the continuity check signals and to reroute the communication network connection responsive to the detection,
wherein the communication network connection comprises a plurality of connections between a source network element and multiple receiver network elements,
wherein, where the source network element supports the local connection rerouting function and at least one of the receiver network elements does not support the local connection rerouting function, the configuring step further comprises configuring the at least one of the receiver network elements to send continuity check signals to the source network element and the enabling step further comprises enabling the local connection rerouting function at the source network element.

15. A system for configuring network elements between which a communication network connection in a communication network may be established, one of the network elements not supporting a local connection rerouting function and another of the network elements supporting the local connection rerouting function, the system comprising:

a transmitter; and a processor configured to configure through the transmitter the one of the network elements to send continuity check signals over the communication network connection and to enable through the transmitter the local connection rerouting fUnction at the other of the network elements, wherein the local connection rerouting function is adapted to detect a loss of continuity on the communication network connection based on the continuity check signals and to reroute the communication network connection responsive to the detection, wherein the processor is further configured to determine whether the network elements support the local connection rerouting function by accessing records in a database at a network management system of the communication network to determine a type of equipment implemented at each of the network elements.

16. The system of claim 15, further comprising a memory for storing instructions which when executed by the processor cause the processor to configure the one of the network elements to enable the local connection rerouting function at the other of the network elements.

17. The system of claim 15, wherein the processor is configured to configure the one of the network elements by configuring a persistent endpoint and transmitting the persistent endpoint through the transmitter to the one of the network elements.

18. The system of claim 17, wherein the system comprises a network management system of the communication network.

19. The system of claim 17, wherein the processor is configured to enable the local connection rerouting function at the other of the network elements by transmitting a configuration command through the transmitter to the other of the network elements, and wherein the other of the network elements configures a persistent endpoint in response to the configuration command.

20. The system of claim 15, wherein the processor is configured to enable the local connection rerouting function at the other of the network elements by transmitting through the transmitter a configuration command to the other of the network elements.

21. The system of claim 15, wherein the communication network comprises an Asynchronous Transfer Mode (ATM) network, and wherein the continuity check signals comprise Operations Administration and Maintenance Continuity Check (OAM CC) cells.

22. The system of claim 15, wherein the communication network connection comprises a plurality of connections between a source network element and multiple receiver network elements.

23. The system of claim 22, wherein the processor is configured to:

configure the source network element to send continuity check signals to the receiver network elements over the plurality of connections and enable the local connection rerouting function at any of the receiver network elements which support the local connection rerouting function where the source network element does not support the local connection rerouting function; and configure at least one of the receiver network elements to send continuity check signals to the source network element and enable the local connection rerouting function at the source network element where the source network element supports the local connection rerouting function and the at least one of the receiver network elements does not support the local connection rerouting function.

24. The system of claim 15, wherein the processor is further configured to configure the one of the network elements to receive continuity check signals from the other of the network elements, to detect a loss of continuity based on the continuity check signals from the other of the network elements, to generate an alarm responsive to the detection, and to send the alarm to the processor.

25. The system of claim 24, further comprising:

a receiver, wherein the processor is further configured to receive the alarm from the one of the network elements through the receiver, and to transmit a connection rerouting command through the transmitter to the one of the network elements to reroute the connection.

26. A communication network comprising:

a network management system comprising the system of claim 15; and a plurality of network elements including the one network element and the other network element.

27. A method of rerouting a communication network connection in a communication network between a first network element which does not support a local connection rerouting function and a second network element which supports the local connection rerouting function, the local connection rerouting function adapted to detect a loss of continuity on the connection and to reroute the connection at the second network element responsive to a loss of continuity on the connection, the method comprising:

monitoring the connection at the first network element for continuity check signals sent from the second network element to detect a loss of continuity on the connection based on the continuity check signals;

sending a loss of continuity alarm from the first network element to a remote system responsive to detecting a loss of continuity on the connection at the first network element; and rerouting the connection at the first network element responsive to a connection rerouting command from the remote system;

wherein the method further comprises the remote system determining whether the first and second network elements support the local connection rerouting function, wherein determining comprises determining a type of equipment implemented at each of the first and second network elements by accessing records in a database at a network management system of the communication network.

28. The method of claim 27, wherein the remote system comprises a network management system of the communication network.

29. The method of claim 28, further comprising:

receiving a persistent endpoint from the network management system at the first network element, the network management endpoint configured to perform the operations of monitoring the connection, sending the loss of continuity alarm, and rerouting the connection responsive to the connection rerouting command.

30. The method of claim 27, wherein the connection comprises a plurality of connections between a source network element which does not support the local connection rerouting function and multiple receiver network elements which support the local connection rerouting function, and wherein monitoring comprises monitoring the plurality of connections.

31. The method of claim 27, wherein the connection comprises a plurality of connections between a source network element which supports the local connection rerouting function and multiple receiver network elements which do not support the local connection rerouting function, and wherein monitoring comprises monitoring at each receiver network element the one of the plurality of connections between the source network element and the receiver network element.

32. A network element for a communication network, comprising:
- a transceiver; and
- a processor configured to:
  - monitor through the transceiver a communication network connection to an other network element for continuity check signals sent from the other network element to thereby detect a loss of continuity on the connection, the network element not supporting a local connection rerouting function and the other network element supporting the local connection rerouting function, the local connection rerouting function adapted to detect a loss of continuity on the connection and to reroute the connection at the other network element responsive to a loss of continuity condition on the connection;
  - send a loss of continuity alarm through the transceiver to a remote system responsive to detecting a loss of continuity on the connection; and
  - reroute the connection responsive to a connection rerouting command received through the transceiver from the remote system,
  - wherein the remote system determines whether the network element and the other network element support the local connection rerouting function,
  - wherein determining comprises determining a type of equipment implemented at the network element and the other network element by accessing records in a database at a network management system of the communication network.

33. The network element of claim 32, wherein the remote system comprises a network management system of the communication network.

34. The network element of claim 33, wherein the processor is further configured to receive through the transceiver a persistent endpoint from the network management system, the persistent endpoint configuring the processor to perform the operations of monitoring the connection for continuity check signals sent from the other network element, sending a loss of continuity alarm, and rerouting the connection responsive to a connection rerouting command from the network management system.

35. The network element of claim 32, wherein the connection comprises a plurality of connections between the network element and multiple receiver network elements supporting the local connection rerouting function, and wherein the processor is configured to monitor the plurality of connections.

36. The network element of claim 32, wherein the connection comprises one of a plurality of connections between the other network element and multiple receiver network elements including the network element.

37. The network element of claim 32, wherein the processor implements an Operations Administration and Maintenance Continuity Check (OAM CC) source, an OAM CC sink, and a loss of continuity (LOC) detector, and wherein the continuity check signals comprise OAM CC cells.

38. A communication network comprising:
- a plurality of network elements comprising at least one network element according to claim 32 and at least one other network element; and
- a network management system configured to send a persistent endpoint to the at least one network element, the network management persistent endpoint configuring the processor in each of the at least one network element to perform the operations of monitoring the connection for continuity check signals sent from the other network element, sending a loss of continuity alarm, and rerouting the connection responsive to a connection rerouting command from the network management system.

39. A method of rerouting a communication network connection between a first network element which does not support a local connection rerouting function and a second network element which supports the local connection rerouting function, comprising:
- monitoring the connection at the second network element for continuity check signals sent from the first network element to detect a loss of continuity on the connection based on the continuity check signals; and
- rerouting the connection at the second network element responsive to detection of the loss of continuity,
- wherein the connection comprises a plurality of connections between the second network element and multiple receiver network elements which do not support the local connection rerouting function, and wherein monitoring comprises monitoring the plurality of connections.

40. A network element for a communication network, comprising:
- a transceiver; and
- a processor configured to monitor through the transceiver a communication network connection to an other network element, the network element supporting a local connection rerouting function and the other network element not supporting the local connection rerouting function, for continuity check signals sent from the other network element to thereby detect a loss of continuity on the connection, and to reroute the connection responsive to detection of the loss of continuity,
- wherein the connection comprises a plurality of connections between the network element and multiple receiver network elements which do not support the local connection rerouting function, and wherein the processor is configured to monitor the plurality of connections.

41. The network element of claim 40, wherein the connection comprises one of a plurality of connections between the other network element and multiple receiver network elements including the network element.

42. The network element of claim 40, wherein the processor implements an Operations Administration and Maintenance Continuity Check (OAM CC) source, an OAM CC sink, and a loss of continuity (LOC) detector, and wherein the continuity check signals comprise OAM CC cells.

43. A communication network comprising:
- a plurality of network elements comprising at least one network element according to claim 40 and at least one other network element; and
- a network management system configured to send a configuration command to the at least one network element, each of the at least one network element configuring a respective network element persistent endpoint, each network element persistent endpoint supporting the local connection rerouting function.

* * * * *